United States Patent
Takahashi et al.

(10) Patent No.: US 9,721,608 B2
(45) Date of Patent: Aug. 1, 2017

(54) SPINDLE MOTOR AND DISK DRIVE APPARATUS

(71) Applicant: Nidec Corporation, Kyoto (JP)

(72) Inventors: Katsuya Takahashi, Kyoto (JP); Masahiro Shiraishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/046,760

(22) Filed: Feb. 18, 2016

(65) Prior Publication Data

US 2016/0267937 A1     Sep. 15, 2016

Related U.S. Application Data

(60) Provisional application No. 62/132,635, filed on Mar. 13, 2015.

(30) Foreign Application Priority Data

Nov. 6, 2015   (JP) ................. 2015-218472

(51) Int. Cl.
*G11B 19/20*   (2006.01)
*H02K 5/10*   (2006.01)
(Continued)

(52) U.S. Cl.
CPC .......... *G11B 19/2009* (2013.01); *H02K 5/10* (2013.01); *H02K 5/1677* (2013.01); *H02K 5/15* (2013.01)

(58) Field of Classification Search
CPC .......... G11B 19/2009; G11B 19/2045; G11B 19/2036; H02K 5/1737; H02K 5/1732;
(Continued)

(56) References Cited

U.S. PATENT DOCUMENTS 5,903,408 A  *  5/1999  Omi ................. G11B 5/5526
                                                    360/73.03
6,378,209 B1    4/2002  Gomyo et al.
(Continued)

FOREIGN PATENT DOCUMENTS

JP        10-80091 A      3/1998
JP     2004-301154 A     10/2004

OTHER PUBLICATIONS

Shiraishi et al.; "Spindle Motor and Disk Drive Apparatus"; U.S. Appl. No. 15/180,249, filed Jun. 13, 2016.
(Continued)

*Primary Examiner* — Brian Miller
(74) *Attorney, Agent, or Firm* — Keating & Bennett, LLP

(57) ABSTRACT

A motor includes a rotating portion including a rotor magnet, and arranged to rotate about a central axis extending in a vertical direction; a bearing mechanism arranged to support the rotating portion such that the rotating portion is rotatable about the central axis; a stator portion arranged opposite to the rotor magnet; a housing arranged to accommodate the rotating portion, the bearing mechanism, and the stator portion therein; and a sealing member. The housing includes a base portion substantially in a shape of a plate and arranged to extend radially below the rotating portion. The base portion includes a first lower surface arranged to face downward, and a through hole arranged to pass through the base portion in the vertical direction and arranged to have a portion of the bearing mechanism arranged therein. The sealing member is arranged to cover a lower side of the through hole, and includes at least a metal layer.

17 Claims, 14 Drawing Sheets

(51) Int. Cl.
*H02K 5/167* (2006.01)
*H02K 5/15* (2006.01)

(58) Field of Classification Search
CPC .... H02K 5/173; H02K 5/1677; H02K 5/1675; H02K 5/15
See application file for complete search history.

(56) References Cited

U.S. PATENT DOCUMENTS

| | | | |
|---|---|---|---|
| 7,031,106 B2* | 4/2006 | Miyazaki | F16C 19/163 |
| | | | 277/549 |
| 7,088,023 B1* | 8/2006 | Gomyo | F16C 35/02 |
| | | | 310/40 R |
| 7,460,334 B2* | 12/2008 | Yonei | G11B 17/028 |
| | | | 310/67 R |
| 8,284,515 B2* | 10/2012 | Sekii | F16C 17/105 |
| | | | 360/271.3 |
| 2006/0023339 A1 | 2/2006 | Fukuyama et al. | |
| 2008/0024024 A1* | 1/2008 | Tamaoka | H02K 5/1675 |
| | | | 310/90 |
| 2012/0162818 A1 | 6/2012 | Sugi et al. | |
| 2012/0176700 A1* | 7/2012 | Shinji | G11B 25/043 |
| | | | 360/97.21 |
| 2014/0147065 A1* | 5/2014 | Sugiki | F16C 17/026 |
| | | | 384/107 |

OTHER PUBLICATIONS

Yoneda et al.; "Spindle Motor and Disk Drive Apparatus"; U.S. Appl. No. 15/176,308, filed Jun. 8, 2016.

* cited by examiner

SPINDLE MOTOR AND DISK DRIVE APPARATUS

BACKGROUND OF THE INVENTION

1. Field of the Invention

The present invention relates to a spindle motor for use in a disk drive apparatus.

2. Description of the Related Art

In recent years, in accordance with increased storage density of disks, there has been a demand for disk drive apparatuses, such as, for example, hard disk drives, to control rotation of the disks, movement of heads, and so on with higher precision. For example, in a known hard disk drive (hereinafter referred to simply as an "HDD"), a gas arranged in an interior of the HDD is a low-density gas, such as, for example, a helium gas or a hydrogen gas, and the HDD is thus arranged to achieve a reduction in resistance of the gas against a disk, a head, and so on during rotation of a spindle motor. This contributes to reducing vibration of the disk, the head, and so on, enabling highly precise data recording.

Base portions of some spindle motors (hereinafter referred to simply as "motors") installed in HDDs are defined by portions of housings of the HDDs.

In the case where the interior of the HDD is filled with a gas such as, for example, a helium gas as described above, the helium gas, for example, which has extremely small molecules, tends to easily leak out of the interior of the HDD to an outside of the HDD. Therefore, in the case where a bearing mechanism is fixed in a through hole defined in the base portion, it may be difficult to ensure sufficient sealing of a region at which the base portion and the bearing mechanism are fixed to each other. In a known motor, as a member to achieve sealing of a gap, a rubber ball is used to prevent passing of a gas therethrough. However, when an elastic member such as a rubber member is used as a sealing member, the helium gas, for example, may leak through a slight gap between the sealing member and an edge of the through hole. Moreover, the helium gas has such a small particle size that the helium gas may pass through the rubber ball to leak out.

SUMMARY OF THE INVENTION

A spindle motor for use in a disk drive apparatus according to a preferred embodiment of the present invention includes a rotating portion including a rotor magnet, and arranged to rotate about a central axis extending in a vertical direction; a bearing mechanism arranged to support the rotating portion such that the rotating portion is rotatable about the central axis; a stator portion arranged opposite to the rotor magnet; a housing arranged to accommodate the rotating portion, the bearing mechanism, and the stator portion therein; and a sealing member. The housing includes a base portion substantially in a shape of a plate and arranged to extend radially below the rotating portion. The base portion includes a first lower surface arranged to face downward, and a through hole arranged to pass through the base portion in the vertical direction and arranged to have a portion of the bearing mechanism arranged therein. The sealing member is arranged to cover a lower side of the through hole, and includes at least a metal layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
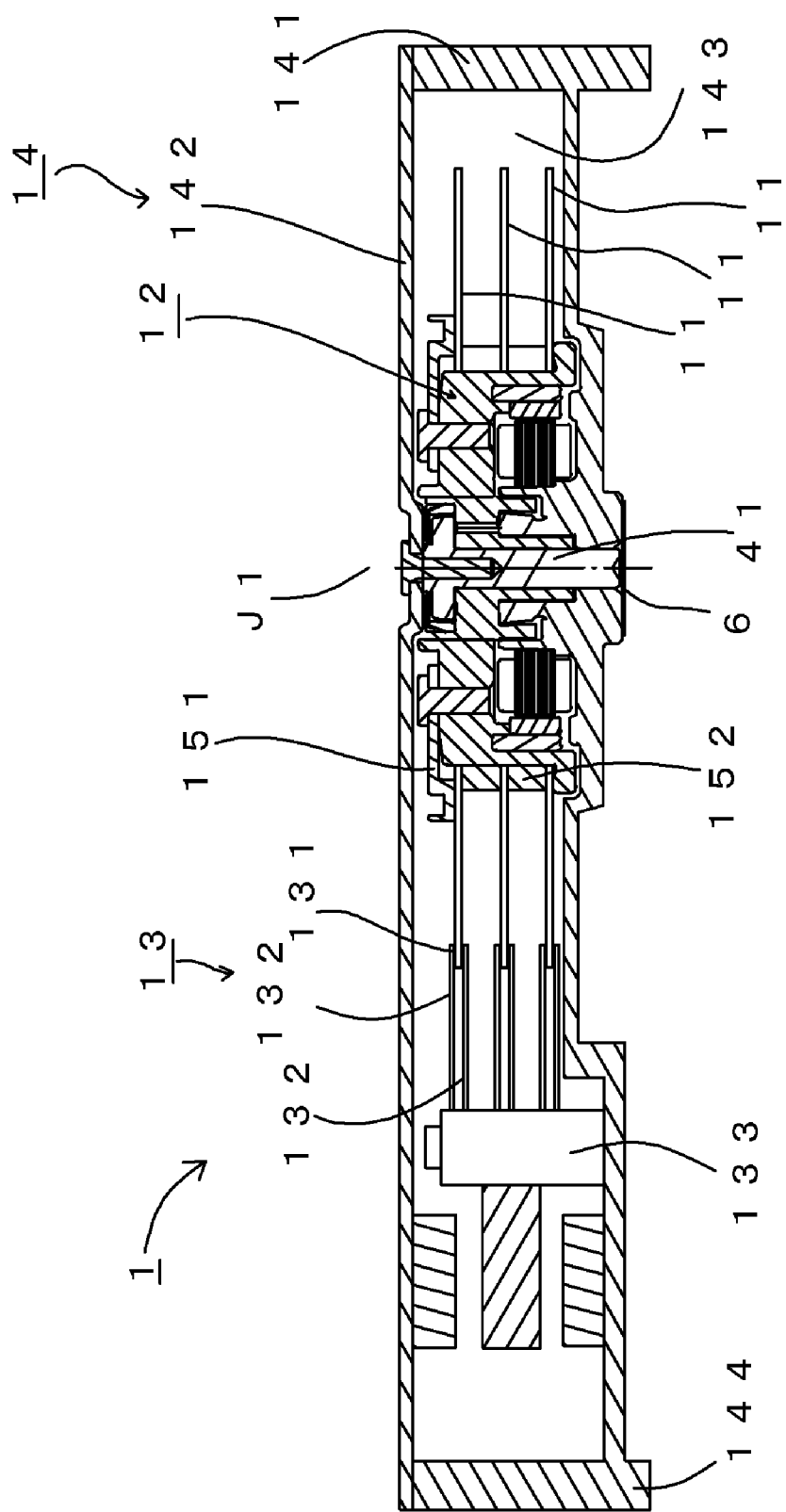
FIG. 1 is a vertical cross-sectional view of a disk drive apparatus according to a first preferred embodiment of the present invention.

Hereinafter, motors and disk drive apparatuses according to preferred embodiments of the present invention will be described. It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides are not meant to indicate relative positions or directions of different members or portions when those members or portions are actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a vertical cross-sectional view of a disk drive apparatus 1 including a spindle motor (hereinafter referred to simply as a "motor") 12 according to a first preferred embodiment of the present invention. The disk drive apparatus 1 is a so-called hard disk drive. The disk drive apparatus 1 includes, for example, three disk-shaped magnetic disks 11, on each of which information is recorded, the motor 12, an access portion 13, a clamper 151, and a housing 14. The motor 12 is arranged to rotate while holding the disks 11. The access portion 13 is arranged to perform reading and/or writing of information from or to each of the disks 11. Note that the number of disks 11 may alternatively be one, two, or more than three.

The housing 14 includes a first housing member 141, which is substantially in the shape of a box without a lid, and a second housing member 142, which is in the shape of a plate. The disks 11, the motor 12, the access portion 13, and the clamper 151 are accommodated in the housing 14. In the disk drive apparatus 1, the second housing member 142 is joined to the first housing member 141 through, for example, welding to define the housing 14. A plurality of leg portions 144, each of which is arranged to extend axially downward, are arranged at a radially outer edge of a lower surface of the first housing member 141.

An interior space 143 of the housing 14 is preferably a clean space with extremely little dirt or dust. In the disk drive apparatus 1, the interior space 143 of the housing 14 is filled with a helium gas. Note, however, that the interior space 143 of the housing 14 may alternatively be filled with another gas, such as, for example, air, a hydrogen gas, or a nitrogen gas, instead of the helium gas. Also note that the interior space 143 of the housing 14 may alternatively be filled with any mixture of these gases.

The three disks 11 are arranged at regular intervals in an axial direction through spacers 152, and are clamped by the clamper 151 and the motor 12. The access portion 13 includes six heads 131, six arms 132, each of which is arranged to support a separate one of the heads 131, and a head actuator mechanism 133. Each of the heads 131 is arranged to magnetically read and/or write information from or to a corresponding one of the disks 11 while being arranged in close proximity to the disk 11. The head actuator mechanism 133 is arranged to actuate each of the arms 132 to move an associated one of the heads 131 relative to a corresponding one of the disks 11. The head 131 is thus arranged to make access to a desired location on the rotating disk 11 while being arranged in close proximity to the disk 11, to carry out the reading and/or writing of the information. Note that each disk 11 may not necessarily be a magnetic disk, but may alternatively be another disk, such as, for example, an optical disk.

Figure 2:
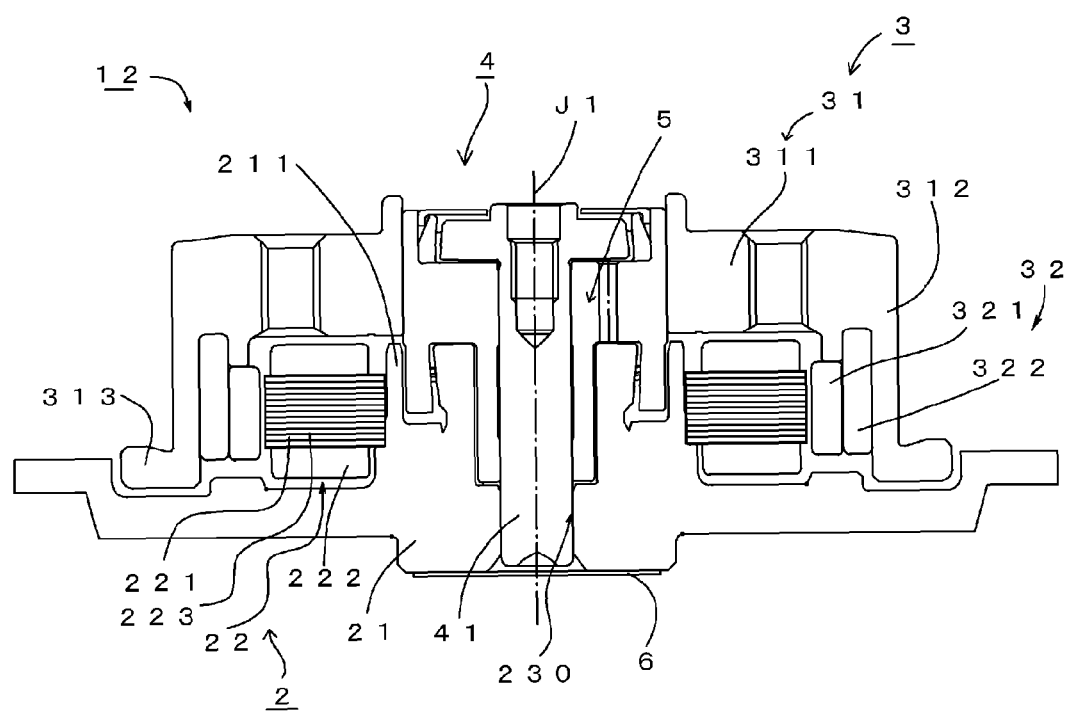
FIG. 2 is a vertical cross-sectional view of a spindle motor according to the first preferred embodiment of the present invention.

Next, the structure of the motor 12 used in the disk drive apparatus 1 will now be described in detail below. FIG. 2 is a vertical cross-sectional view of the motor 12. The motor 12 is an outer-rotor motor. The motor 12 includes a stationary portion 2, a rotating portion 3, and a fluid dynamic bearing mechanism 4 (hereinafter referred to as the "bearing mechanism 4"). The housing 14 is arranged to accommodate the stationary portion 2, the rotating portion 3, and the bearing mechanism 4. The rotating portion 3 is supported through the bearing mechanism 4 to be rotatable about a central axis J1 of the motor 12 with respect to the stationary portion 2. The central axis J1 of the motor 12 is a central axis of each of the stationary portion 2, the rotating portion 3, and the bearing mechanism 4 as well.

The stationary portion 2 is arranged to be stationary relative to the housing 14 of the disk drive apparatus 1. The stationary portion 2 includes a base portion 21 and a stator portion 22. The base portion 21 is substantially in the shape of a plate, and is arranged to extend radially. The base portion 21 is arranged below the rotating portion 3. The base portion 21 defines a portion of the first housing member 141 illustrated in FIG. 1. The base portion 21 includes a through hole 230, and has a sealing member 6 arranged thereon. The through hole 230 is defined in a center of the base portion 21, and is arranged to pass through the base portion 21 in the axial direction. At least a portion of a lower surface of the base portion 21 is arranged to project downward. More specifically, a portion of the lower surface of the base portion 21 which is near and around the through hole 230 is arranged to project downward. Preferably, this portion is substantially annular and is centered on the central axis J1.

Referring to FIG. 2, the stator portion 22 is an armature including a stator core 221 and a plurality of coils 222. The stator core 221 is fixed to an outer circumferential surface of a cylindrical holder 211 of the base portion 21. The stator core 221 includes a plurality of teeth (not shown) arranged to extend radially. Each coil 222 is wound around a separate one of the teeth.

The rotating portion 3 is arranged to be rotatable about the central axis J1 of the motor 12 relative to the stationary portion 2 through the bearing mechanism 4. The rotating portion 3 includes a rotor hub 31 and a magnetic member 32. A metal that is not a ferromagnetic material, such as, for example, an aluminum alloy, is used as a material of the rotor hub 31. The rotor hub 31 includes a hub body 311, a cylindrical portion 312, and a disk mount portion 313. The hub body 311 is substantially in the shape of a disk. The cylindrical portion 312 is arranged to project downward from an outer edge portion of the hub body 311.

The disk mount portion 313 is arranged to extend radially outward from a lower portion of the cylindrical portion 312. In FIG. 2, the disk mount portion 313 is arranged to project from a lower end portion of the cylindrical portion 312. A lower surface of the lowermost magnetic disk 11 is arranged to be in contact with at least a portion of an upper surface of the disk mount portion 313, which is annular. That is, the upper surface of the disk mount portion 313 defines a disk mount surface.

The magnetic member 32 includes a substantially cylindrical rotor magnet 321 and a back iron 322. The rotor magnet 321 is fixed to an inside of the cylindrical portion 312 with the back iron 322 intervening therebetween. The rotor magnet 321 is arranged radially opposite to the stator portion 22.

The bearing mechanism 4 includes a shaft 41, a sleeve portion 5, and a lubricating fluid. As mentioned above, the shaft 41 is a portion of the stationary portion 2. The sleeve portion 5 is a portion of the rotating portion 3. A lower portion of the shaft 41 is fixed in the through hole 230 through press fitting. In the through hole 230, a wall surface of the through hole 230 and an outer circumferential surface of the shaft 41, which is a portion of the bearing mechanism 4, are fixed to each other.

The lubricating fluid is arranged between the sleeve portion 5 and a combination of the shaft 41 and the base portion 21. The sleeve portion 5 is supported to be rotatable with respect to the shaft 41 through the lubricating fluid. Note that the rotating portion 3 may alternatively be supported to be rotatable with respect to the stationary portion 2 through a bearing having another structure, such as, for example, a ball bearing or a plain bearing, instead of a fluid bearing as described above.

The sleeve portion 5 is arranged radially inside of the rotor hub 31. In the preferred embodiment illustrated in FIG. 2, the sleeve portion 5 and the rotor hub 31 are defined by separate members. Note, however, that the sleeve portion 5 and the rotor hub 31 may alternatively by defined by a single monolithic member.

The rotor magnet 321 is substantially cylindrical, and is arranged radially outside of the stator portion 22. An inner circumferential surface of the rotor magnet 321 includes north and south poles arranged to alternate with each other in a circumferential direction. The inner circumferential surface of the rotor magnet 321 is arranged radially opposite to a radially outer end surface of each of the teeth (not shown) with a slight gap intervening therebetween. That is, the rotor magnet 321 includes a pole surface arranged radially opposite to the stator portion 22.

The back iron 322 is a substantially cylindrical member arranged to intervene between the rotor hub 31 and the rotor magnet 321. A material of the back iron 322 is, for example, a metal that is a ferromagnetic material. The back iron 322 is arranged to cover at least a portion of an outer circumferential surface of the rotor magnet 321. This contributes to preventing a magnetic force from leaking through the outer circumferential surface of the rotor magnet 321, that is, contributes to preventing a reduction in a torque produced in the motor 12 while the motor 12 is running.

Once electric drive currents are supplied from an external power supply or the like to the coils 222, magnetic flux is generated around each of the teeth (not shown). Interaction between the magnetic flux of the teeth 222 and magnetic flux of the rotor magnet 321 produces a circumferential torque between the stationary portion 2 and the rotating portion 3, so that the rotating portion 3 is caused to rotate about the central axis J1 with respect to the stationary portion 2. The magnetic disks 11 supported by the rotor hub 31 are caused to rotate about the central axis J1 together with the rotating portion 3.

The sealing member 6 is arranged on the lower surface of the base portion 21. The sealing member 6 is arranged to cover a lower end opening of the through hole 230. In the present preferred embodiment, the external shape of the sealing member 6 is circular in a plan view. Note that the external shape of the sealing member 6 in the plan view is not limited in any particular manner, and may be, for example, polygonal or annular.

Referring to FIG. 1, a bottom surface of each leg portion 144 is arranged at a level lower than that of a lowermost surface of the sealing member 6 and that of a lowermost surface of the base portion 21. This prevents a lower surface of the sealing member 6 from being arranged at a level lower than that of the bottom surface of each leg portion 144 even when the lower surface of the sealing member 6 is arranged at a level lower than that of the lower surface of the base portion 21 as illustrated in FIG. 2.

Figure 3:
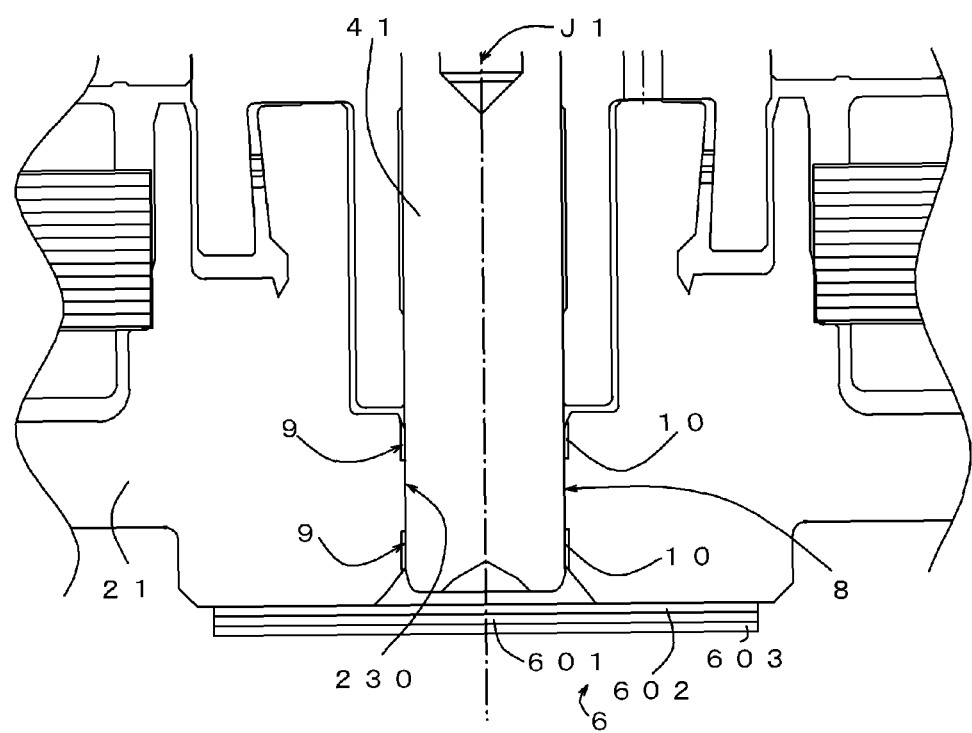
FIG. 3 is a vertical cross-sectional view of a portion of the spindle motor according to the first preferred embodiment of the present invention, illustrating a through hole and its vicinity.

FIG. 3 is an enlarged vertical cross-sectional view of a portion of the motor 12 according to the first preferred embodiment, illustrating the through hole 230 and its vicinity. The sealing member 6 includes at least a metal layer 601. Aluminum, an aluminum alloy, or a stainless alloy, for example, is used as a material of the metal layer 601. The sealing member 6 is fixed to a lower side of the base portion 21 through, for example, adhesion, welding, or the like. This contributes to preventing the gas arranged in the interior space 143 of the housing 14 from passing through the through hole 230 and the sealing member 6 to leak out of the housing 14.

In this preferred embodiment, the sealing member 6 includes an adhesive layer 602 and a resin layer 603 in addition to the metal layer 601. The metal layer 601 is arranged axially between the adhesive layer 602 and the resin layer 603. The resin layer 603 is, for example, a polyimide layer or the like. The adhesive layer 602 is arranged between the lower surface of the base portion 21 and the metal layer 601. The sealing member 6 is fixed to the base portion 21 through the adhesive layer 602. As a result, the metal layer 601 is able to prevent the helium gas from passing through the sealing member 6. Moreover, the above arrangement makes it possible to fix the sealing member 6 to the base portion 21 while leaving no space between the sealing member 6 and the base portion 21. The resin layer 603 is arranged on a lower surface of the metal layer 601. This prevents an external force or the like from damaging the metal layer 601.

Note that the sealing member 6 may include neither the adhesive layer 602 nor the resin layer 603. That is, the sealing member 6 may alternatively be made of only a metallic material. In this case, it is desirable that the sealing member 6 be defined by a plate-shaped metal sheet. The sealing member 6 made of the metallic material is fixed to the base portion 21 through, for example, welding or the like. This contributes to preventing the helium gas or the like from leaking out of the housing 14 through the through hole 230. Note that the sealing member 6 may alternatively include the metal layer 601 and one of the adhesive layer 602 and the resin layer 603.

A fixing region 8, at which the bearing mechanism 4 and the base portion 21 are fixed to each other, is defined between an outer circumferential portion of the bearing mechanism 4 and an inner circumferential portion of the base portion 21 which defines the through hole 230. Over the fixing region 8, a portion of the bearing mechanism 4 is fixed in the through hole 230 through press fitting. In other words, at least a portion of the shaft 41 is fixed in the through hole 230 through press fitting. Sealing regions 9 are arranged both above and below the fixing region 8. At each sealing region 9, an adhesive is arranged to extend all the way around the central axis J1 to close a gap between the outer circumferential portion of the bearing mechanism 4 and the inner circumferential portion of the base portion 21.

In more detail, both above and below the fixing region 8, radial gaps are defined between an outer circumferential surface of the bearing mechanism 4 and the wall surface of the through hole 230. Each of these gaps is arranged to extend all the way around the central axis J1 between the bearing mechanism 4 and the wall surface of the through hole 230. The lower one of these gaps is arranged to be in communication with the through hole 230. The upper one of these gaps is arranged to be in communication with a space in which the sleeve portion 5 is arranged.

A sealant 10, such as, for example, the adhesive, is arranged in each of the gaps arranged above and below the fixing region 8. In other words, the sealant 10 is arranged to extend all the way around the central axis J1 in each sealing region 9. This closes even a slight gap between the outer circumferential portion of the bearing mechanism 4 and the base portion 21. This in turn contributes to preventing the gas from leaking out of the housing 14 through the through hole 230.

While preferred embodiments of the present invention have been described above, it will be understood that the present invention is not limited to the above-described preferred embodiments.

Figure 4:
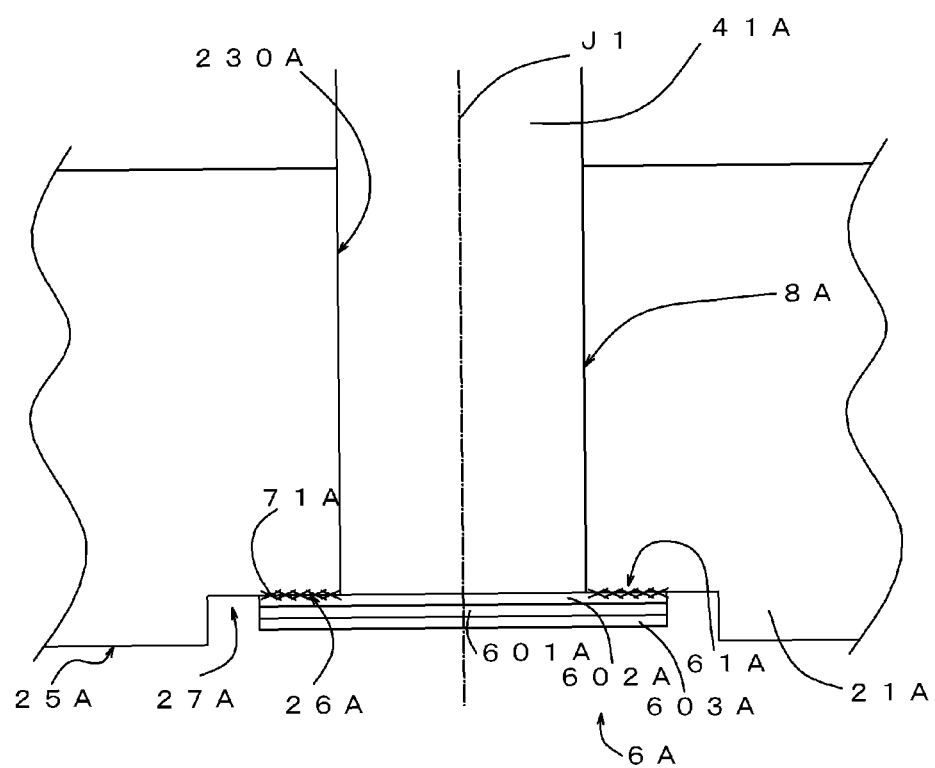
FIG. 4 is a vertical cross-sectional view of a portion of a motor according to a preferred modification of the first preferred embodiment of the present invention, illustrating a through hole and its vicinity.

Next, preferred modifications of the above-described first preferred embodiment of the present invention will be described below. In the following description, descriptions of features of the motor 12 according to the first preferred embodiment which are shared by motors according to the preferred modifications thereof will be omitted. FIG. 4 is a vertical cross-sectional view of a portion of a motor according to a modification of the first preferred embodiment, illustrating a through hole 230A and its vicinity.

A base portion 21A includes the through hole 230A. The through hole 230A does not include the sealing region 9 as is provided in the first preferred embodiment, and includes only a fixing region 8A. That is, a portion of a shaft 41A is fixed in the through hole 230A through press fitting or shrink fitting over the entire axial extent of the through hole 230A.

A recessed portion 27A, which has a radial width greater than a diameter of the through hole 230A and which is recessed axially upward, is defined in a lower surface of the base portion 21A. A lower end opening of the through hole 230A is arranged in the recessed portion 27A. A sealing member 6A is arranged in the recessed portion 27A.

In more detail, the recessed portion 27A includes a second lower surface 26A, which faces downward and which is arranged at a level higher than that of a first lower surface 25A, which is the lower surface of the base portion 21A. The second lower surface 26A is a bottom surface of the recessed portion 27A. The through hole 230A is arranged to be open in the second lower surface 26A. The second lower surface 26A is arranged to extend radially from the lower end opening of the through hole 230A. The recessed portion 27A is arranged to be open in the first lower surface 25A of the base portion 21A. The second lower surface 26A is substantially parallel to the first lower surface 25A of the base portion 21A. In this modification, the first lower surface 25A of the base portion 21A is substantially perpendicular to a central axis J1. That is, the second lower surface 26A is substantially perpendicular to the central axis J1. This enables an operator or the like to easily fix the sealing member 6A to the second lower surface 26A during a process of assembling the motor.

The sealing member 6A is substantially in the shape of a disk, and includes a metal layer 601A, an adhesive layer 602A, and a resin layer 603A. The sealing member 6A is arranged to cover the entire lower end opening of the through hole 230A. The sealing member 6A includes an upper surface 61A, which is axially fixed to the second lower surface 26A. An adhesive 71A is arranged axially between the upper surface 61A and the second lower surface 26A. The adhesive 71A is arranged to extend all the way around the central axis J1 between the upper surface 61A and the second lower surface 26A. A radial gap is defined between the sealing member 6A and a side surface of the recessed portion 27A. That is, an outside surface of the sealing member 6A is arranged radially opposite to the side surface of the recessed portion 27A. This makes it easy to arrange the sealing member 6A in the recessed portion 27A.

In addition, the upper surface 61A is arranged to be in contact with a lower end portion of the shaft 41A. The upper surface 61A is preferably fixed to the lower end portion of the shaft 41A through, for example, an adhesive. Note that a portion of the adhesive 71A may be arranged in the gap between the sealing member 6A and the side surface of the recessed portion 27A. Also note that another adhesive, different from the adhesive 71A, for example, may be arranged in the gap between the sealing member 6A and the side surface of the recessed portion 27A.

The adhesive used to fix the second lower surface 26A and the upper surface 61A to each other is preferably an epoxy adhesive, i.e., an adhesive possessing a thermosetting property. Note, however, that the adhesive used to fix the second lower surface 26A and the upper surface 61A to each other may alternatively be an adhesive possessing an anaerobic property or a UV-curing property, for example.

Figure 5:
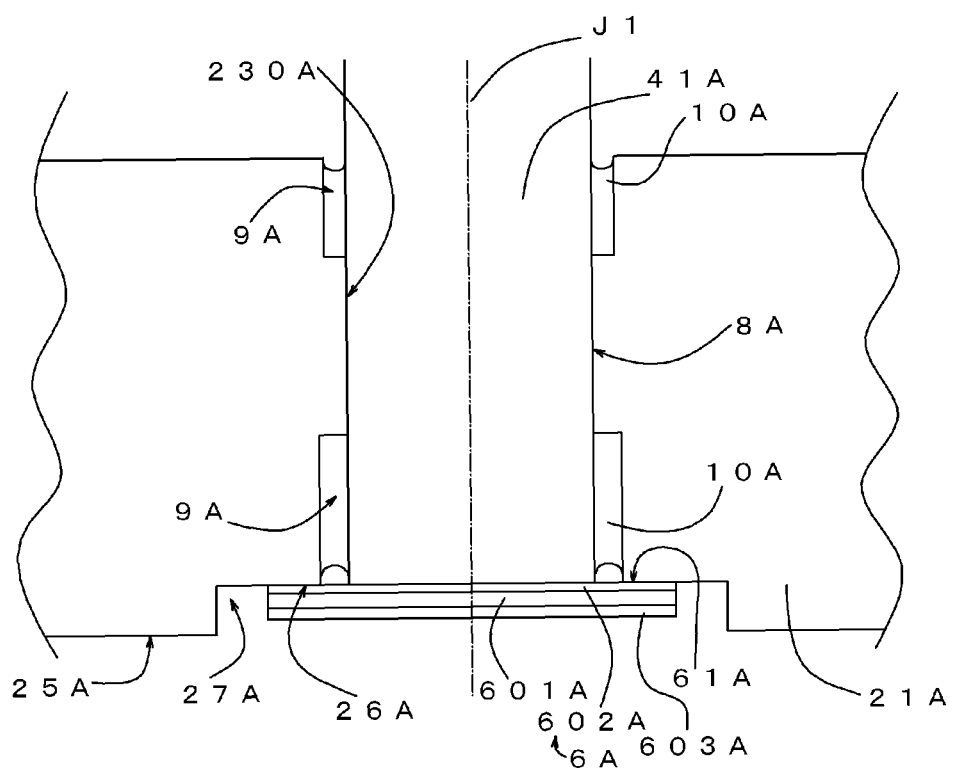
FIG. 5 is a vertical cross-sectional view of a portion of a motor according to a preferred modification of the first preferred embodiment of the present invention, illustrating a through hole and its vicinity.

FIG. 5 is a vertical cross-sectional view of a portion of a motor according to another preferred modification of the first preferred embodiment, illustrating a through hole 230A and its vicinity. As is similarly the case with the above-described preferred embodiment, a base portion 21A is substantially in the shape of a plate, and includes the through hole 230A, which is arranged to pass through the base portion 21A in the axial direction, and a first lower surface 25A facing downward. A sealing member 6A is substantially in the shape of a disk, and includes a metal layer 601A, an adhesive layer 602A, and a resin layer 603A. The sealing member 6A is fixed to a second lower surface 26A, which faces downward, of a recessed portion 27A through the adhesive layer 602A. The sealing member 6A is arranged to cover a lower end opening of the through hole 230A.

A fixing region 8A and sealing regions 9A, which are arranged in the axial direction, are arranged between an outer circumferential portion of a bearing mechanism 4A and an inner circumferential portion 23A of the base portion 21A which defines the through hole 230A. In more detail, the fixing region 8A is defined between a shaft 41A and the inner circumferential portion 23A of the base portion 21A. At the fixing region 8A, a portion of the shaft 41A which corresponds to the outer circumferential portion of the bearing mechanism 4A and the inner circumferential portion 23A of the base portion 21A are fixed to each other through, for example, press fitting, shrink fitting, adhesion, or the like.

The sealing regions 9A are arranged one above and the other below the fixing region 8A. That is, one of the sealing regions 9A is arranged between the fixing region 8A and the sealing member 6A. The other sealing region 9A is arranged between the fixing region 8A and an upper end opening of the through hole 230A. At each sealing region 9A, a radially extending seal gap is defined between the bearing mechanism 4A and an edge of the through hole 230A. As is similarly the case with the above-described preferred embodiment, a sealant 10A, such as, for example, an adhesive, is arranged in the seal gap. This contributes to preventing a gas, such as, for example, a helium gas, from leaking out of a housing 14, that is, out of the motor.

Note that, at each seal gap, one of an outer circumferential surface of the bearing mechanism 4A and a wall surface of the through hole 230A may be arranged to have a tapered shape, being inclined with respect to a central axis J1.

Figure 6:
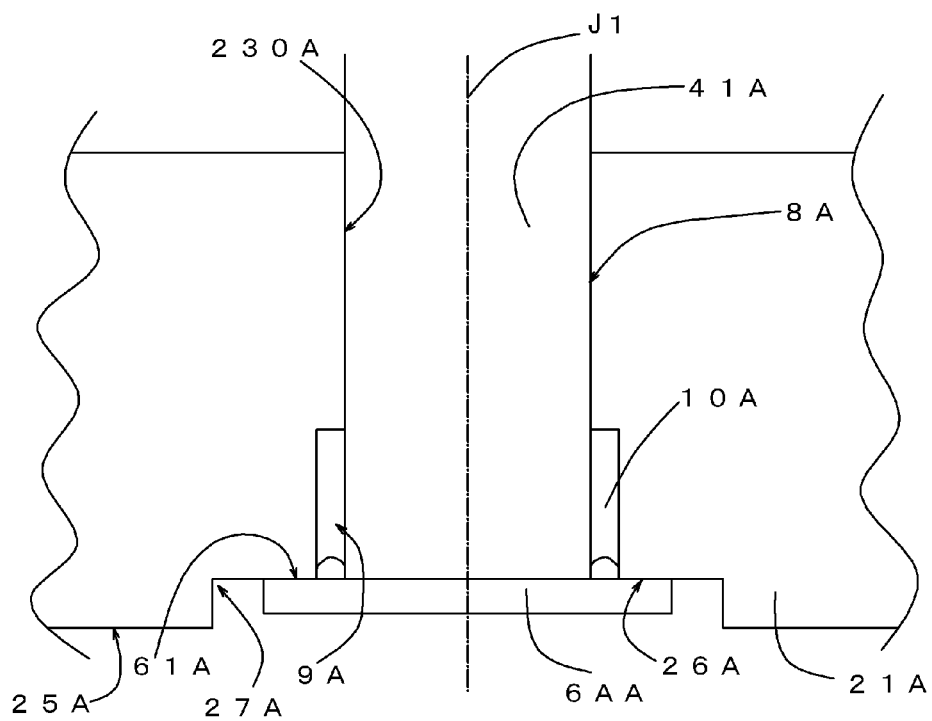
FIG. 6 is a vertical cross-sectional view of a portion of a motor according to a preferred modification of the first preferred embodiment of the present invention, illustrating a through hole and its vicinity.
Figure 7:
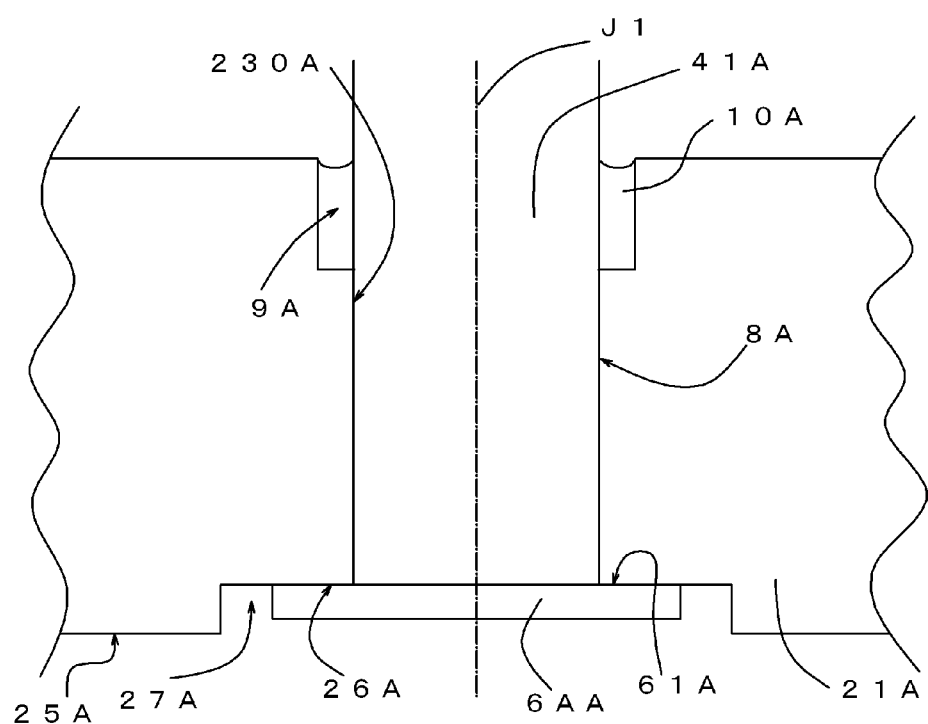
FIG. 7 is a vertical cross-sectional view of a portion of a motor according to a preferred modification of the first preferred embodiment of the present invention, illustrating a through hole and its vicinity.

Each of FIGS. 6 and 7 is a vertical cross-sectional view of a portion of a motor according to another preferred modification of the first preferred embodiment, illustrating a through hole 230A and its vicinity. In each of these preferred modifications, a sealing region 9A is arranged above or below a fixing region 8A. In FIG. 6, the sealing region 9A is arranged only below the fixing region 8A. In FIG. 7, the sealing region 9A is arranged only above the fixing region 8A.

A sealing member 6AA is made of a metallic material, and is in the shape of a disk. The sealing member 6AA is arranged to have an outside diameter greater than a diameter of the through hole 230A. The sealing member 6AA is accommodated in a recessed portion 27A, and is arranged to cover a lower end opening of the through hole 230A. The sealing member 6AA is preferably arranged below a shaft 41A. A lower end portion of the shaft 41A and an upper surface 61A of the sealing member 6AA may be arranged to be in contact with each other, or alternatively, a gap may be defined between the lower end portion of the shaft 41A and the upper surface 61A of the sealing member 6AA. As is similarly the case with the above-described modifications, the upper surface 61A of the sealing member 6AA is fixed to a second lower surface 26A, which is a bottom surface of the recessed portion 27A, through, for example, an adhesive. An outside surface of the sealing member 6AA is arranged radially opposite to a side surface of the recessed portion 27A. Note that an adhesive or the like may be arranged in a gap defined between the outside surface of the sealing member 6AA and the side surface of the recessed portion 27A.

The above arrangement also contributes to preventing a gas, such as, for example, a helium gas, from leaking out of a housing 14, that is, out of the motor. The structure of the motor according to this modification is otherwise similar to the structure of the motor according to the first preferred embodiment or any of the above-described modifications thereof, and a description thereof is therefore omitted.

Figure 8:
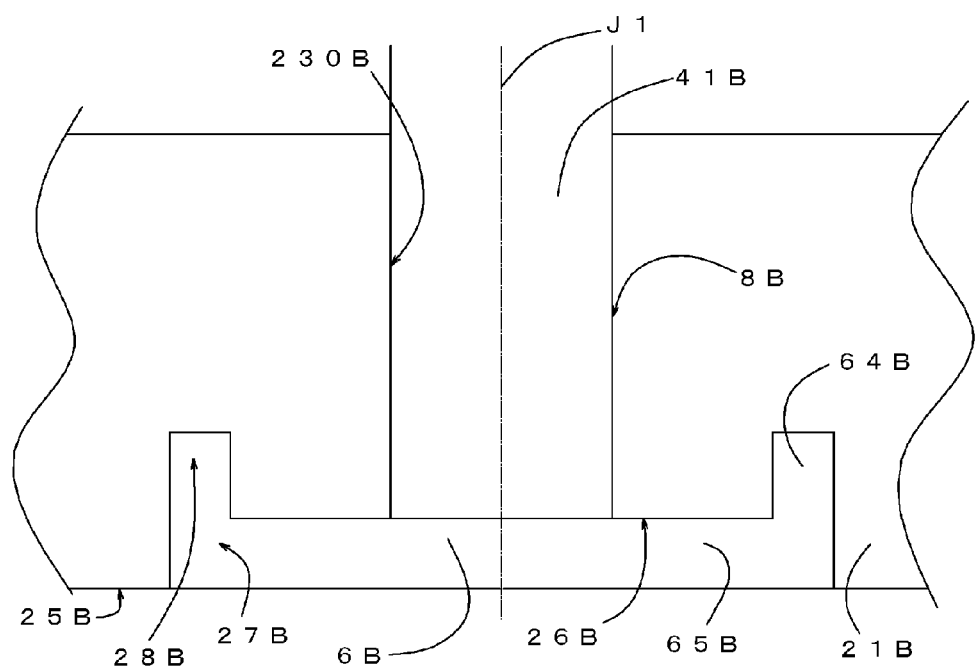
FIG. 8 is a vertical cross-sectional view of a portion of a motor according to a preferred modification of the first preferred embodiment of the present invention, illustrating a through hole and its vicinity.

FIG. 8 is a vertical cross-sectional view of a portion of a motor according to another preferred modification of the first preferred embodiment, illustrating a through hole 230B and its vicinity. A base portion 21B includes a first lower surface 25B and a recessed portion 27B, which has a radial width greater than a diameter of the through hole 230B and which is arranged near a lower end of the through hole 230B. The recessed portion 27B includes a second lower surface 26B, and a groove portion 28B recessed downward and extending all the way around a central axis J1 is defined in the second lower surface 26B.

A lower end opening of the through hole 230B is arranged in the recessed portion 27B, and a sealing member 6B is arranged in the recessed portion 27B. The sealing member 6B is substantially in the shape of a plate, and includes a tubular portion 64B arranged to extend upward from a radially outer end portion of the sealing member 6B. An outer circumferential surface of the tubular portion 64B is fixed to a side surface of the recessed portion 27B through, for example, press fitting, adhesion, shrink fitting, or the like. At least a portion of the tubular portion 27B is accommodated in the groove portion 28B, which is defined in the recessed portion 27B. At least a portion of the tubular portion 64B is fixed in the groove portion 28B through, for example, press fitting, adhesion, shrink fitting, or the like. A lower surface of the sealing member 6B is arranged to be flush with a lower surface of the base portion 21B. Thus, the sealing member 6B can be fixed to the base portion 21B without increasing the axial dimension of the motor. An upper surface of the sealing member 6B is arranged to be in contact with a bottom surface of the recessed portion 27B through, for example, an adhesive. The upper surface of the sealing member 6B is arranged to be in contact with a lower end portion of a shaft 41B. The upper surface of the sealing member 6B is arranged to cover a lower end opening of the through hole 230B.

Thus, the sealing member 6B can be arranged in the entire recessed portion 27B, and the sealing member 6B can be integrally fixed to the base portion 21B. This contributes to preventing a gas, such as, for example, a helium gas, from leaking out of a housing 14.

Figure 9:
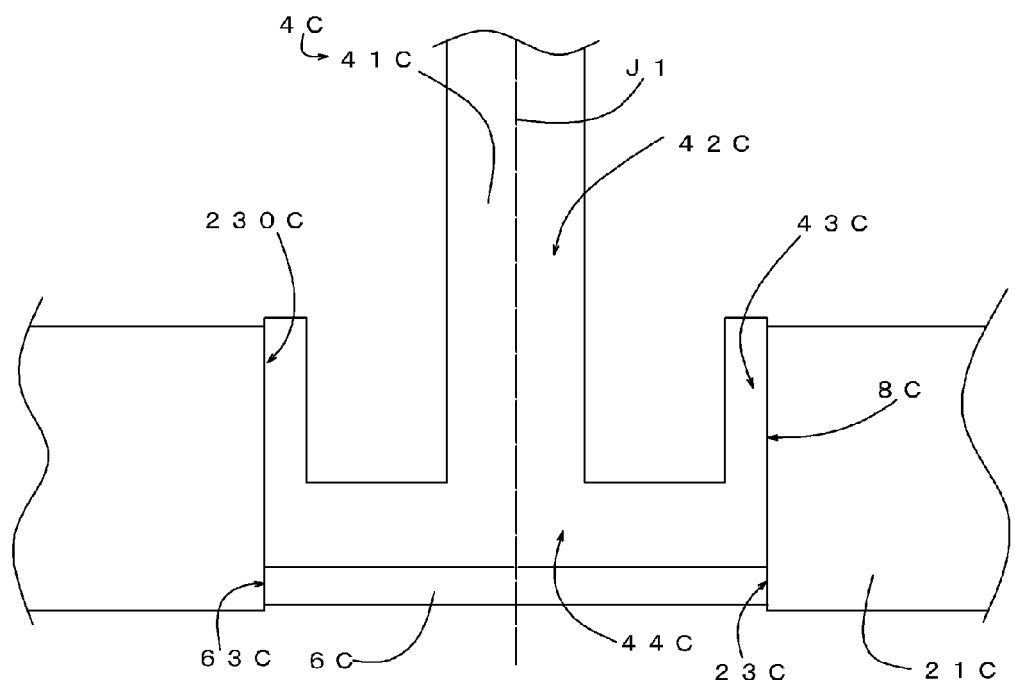
FIG. 9 is a vertical cross-sectional view of a portion of a motor according to a preferred modification of the first preferred embodiment of the present invention, illustrating a through hole and its vicinity.

FIG. 9 is a vertical cross-sectional view of a portion of a motor according to another preferred modification of the first preferred embodiment, illustrating a through hole 230C and its vicinity. A bearing mechanism 4C includes a shaft 41C. The shaft 41C includes a shaft portion 42C, a bottom portion 44C, and a wall portion 43C. The shaft portion 42C is columnar, and is arranged to extend along a central axis J1. The bottom portion 44C is arranged to extend radially outward from a lower portion of the shaft portion 42C. The external shape of the bottom portion 44C substantially corresponds with the external shape of an opening portion of the through hole 230C when viewed in the axial direction. The wall portion 43C is tubular, and is arranged to extend axially upward from an outer edge of the bottom portion 44C. The bottom portion 44C is arranged at a level higher than that of a lower end opening of the through hole 230C. An outside surface of the wall portion 43C is fixed to a wall surface of the through hole 230C through, for example, press fitting, adhesion, shrink fitting, or the like. That is, a fixing region 8C is defined between an inner circumferential portion 23C of a base portion 21C and an outer circumferential portion of the wall portion 43C. In FIG. 9, the outside surface of the wall portion 43C is arranged to be in contact with the wall surface of the through hole 230C over substantially the entire axial extent of the outside surface of the wall portion 43C. In other words, the fixing region 8C is defined between the outside surface of the wall portion 43C and the wall surface of the through hole 230C over substantially the entire axial extent of the outside surface of the wall portion 43C.

A sealing member 6C is substantially in the shape of a disk, and includes only a metal layer. An upper surface of the sealing member 6C is arranged to be in contact with a lower surface of the bottom portion 44C. More preferably, the upper surface of the sealing member 6C is fixed to the lower surface of the bottom portion 44C through, for example, an adhesive. The sealing member 6C is fixed in the through hole 230C through, for example, press fitting, adhesion, shrink fitting, or the like. The sealing member 6C is arranged to have an outside diameter substantially equal to an outside diameter of the bottom portion 44C. The outside diameter of the sealing member 6C is substantially equal to a diameter of the through hole 230C. That is, the sealing member 6C is arranged to close the through hole 230C. The shaft 41C and the sealing member 6C thus close the through hole 230C to prevent a gas, such as, for example, a helium gas, from leaking out of a housing 14.

Figure 10:
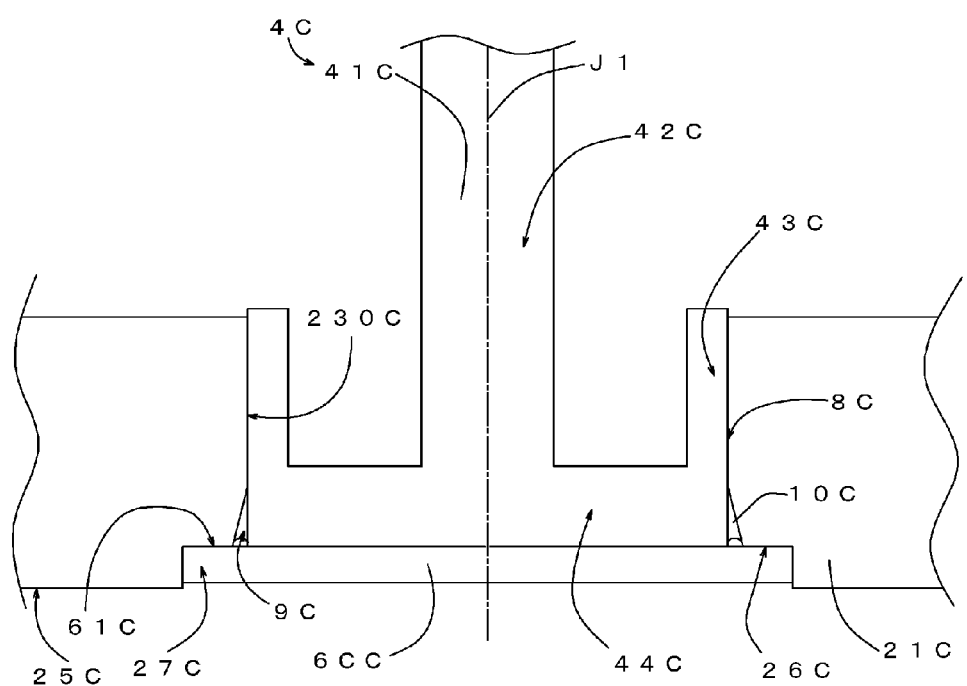
FIG. 10 is a vertical cross-sectional view of a portion of a motor according to a preferred modification of the first preferred embodiment of the present invention, illustrating a through hole and its vicinity.
Figure 11:
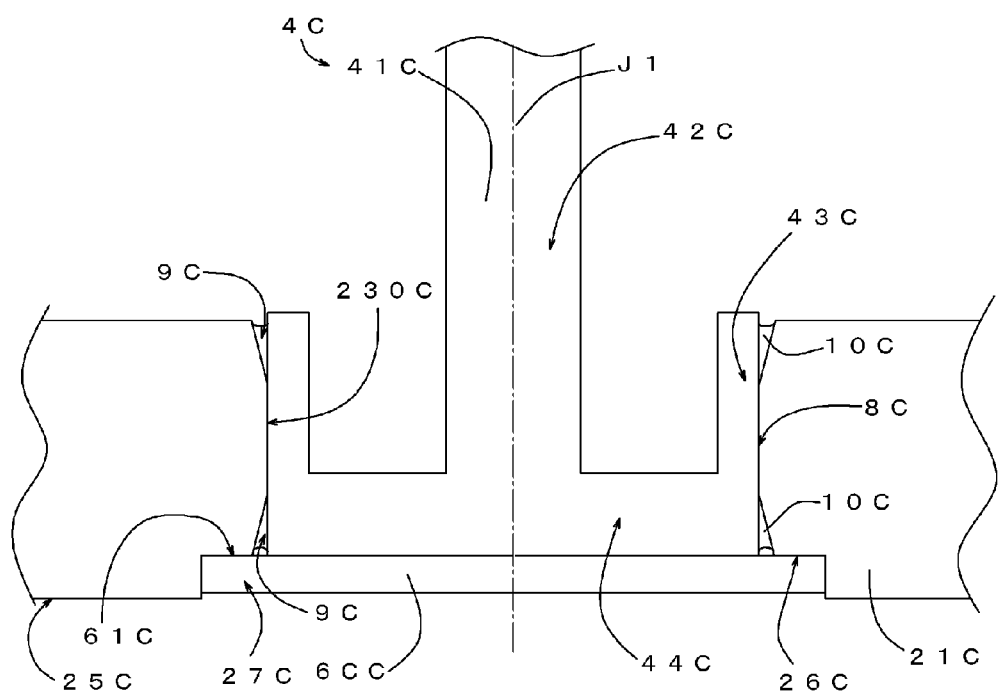
FIG. 11 is a vertical cross-sectional view of a portion of a motor according to a preferred modification of the first preferred embodiment of the present invention, illustrating a through hole and its vicinity.

Each of FIGS. 10 and 11 is a vertical cross-sectional view of a portion of a motor according to another preferred modification of the first preferred embodiment, illustrating a through hole 230C and its vicinity. As is similarly the case with the modification illustrated in FIG. 9, in each of the modifications illustrated in FIGS. 10 and 11, a bearing mechanism 4C includes a shaft 41C. The shaft 41C includes a shaft portion 42C, a bottom portion 44C, and a wall portion 43C.

A base portion 21C includes a first lower surface 25C, and the first lower surface 25C includes a recessed portion 27C arranged to have a radial dimension greater than a diameter of a lower end opening of the through hole 230C. The lower end opening of the through hole 230C is arranged in the recessed portion 27C. A second lower surface 26C is a bottom surface, which faces downward, of the recessed portion 27C, and is arranged to extend radially outward from the lower end opening of the through hole 230C. The second lower surface 26C is arranged to be flush with a lower surface of the bottom portion 44C.

A sealing member 6CC is substantially in the shape of a disk, and includes only a metal layer. A portion of an upper surface 61C of the sealing member 6CC is arranged to be in contact with the lower surface of the bottom portion 44C. More preferably, a portion of the upper surface 61C of the sealing member 6CC is fixed to the lower surface of the bottom portion 44C through, for example, an adhesive. The upper surface 61C of the sealing member 6CC is arranged to be in axial contact with the second lower surface 26C, which faces downward, of the recessed portion 27C as well. The upper surface 61C is fixed to the second lower surface 26C through, for example, an adhesive.

The distance between a central axis J1 and a wall surface of a lower end portion of the through hole 230C is arranged to gradually increase with decreasing height. That is, the wall surface of the lower end portion of the through hole 230C includes a tapered surface angled with respect to the central axis J1. A radial gap is defined between the tapered surface of the through hole 230C and the wall portion 43C. A sealant 10C, such as, for example, an adhesive, is arranged in this gap. That is, the tapered surface of the through hole 230C and the wall portion 43C together define a sealing region 9C. In other words, a fixing region 8C is defined between the wall portion 43C and the wall surface of the through hole 230C, and the sealing region 9C is arranged below the fixing region 8C.

Note that a wall surface of an upper end portion of the through hole 230C may include a tapered surface angled with respect to the central axis J1. In this case, the tapered surface of the upper end portion of the through hole 230C and the wall portion 43C together define a sealing region 9C. Referring to FIG. 11, the wall surfaces of both the upper and lower end portions of the through hole 230C may include the tapered surfaces to define the sealing regions 9C together with the wall portion 43C.

Note that the tapered surface(s) may be defined not in the wall surface(s) of the upper and/or lower end portion(s) of the through hole 230C but in the wall portion 43C. Also note that the tapered surface(s) may be defined in both the wall surface(s) of the upper and/or lower end portion(s) of the through hole 230C and the wall portion 43C. Also note that the sealing region 9C, at which the tapered surface is defined in at least one of the wall portion 43C and the wall surface of the upper or lower end portion of the through hole 230C, may be arranged in only one of the upper and lower end portions of the through hole 230C. Also note that the wall surface(s) of the upper and/or lower end portion(s) of the through hole 230C may include a curved surface in place of the tapered surface.

Figure 12:
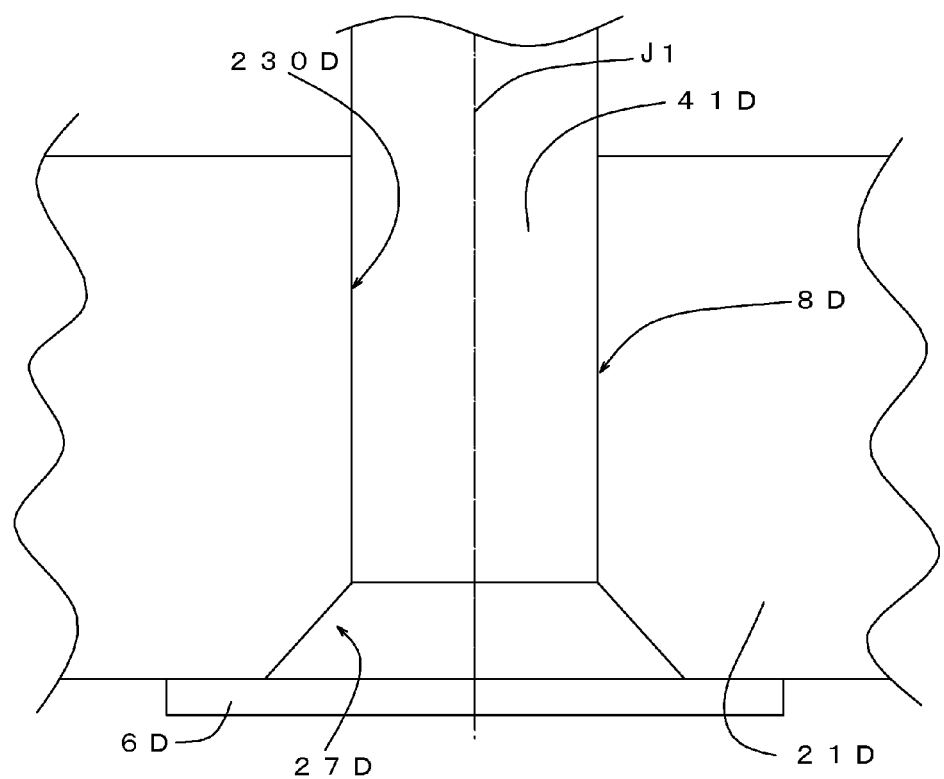
FIG. 12 is a vertical cross-sectional view of a portion of a motor according to a preferred modification of the first preferred embodiment of the present invention, illustrating a through hole and its vicinity.

FIG. 12 is a vertical cross-sectional view of a portion of a motor according to another preferred modification of the first preferred embodiment, illustrating a through hole 230D and its vicinity. A base portion 21D includes a recessed portion 27D arranged to extend more radially outward than the through hole 230D. The radial distance between a side surface of the recessed portion 27D and a central axis J1 is arranged to gradually increase with decreasing height. The side surface of the recessed portion 27D of an opening portion of the recessed portion 27D is defined by a curved surface or an inclined surface angled with respect to the central axis J1. In FIG. 12, The side surface of the recessed portion 27D of the opening portion of the recessed portion 27D is defined by an inclined surface angled with respect to the central axis J1.

A sealing member 6D is arranged on a lower side of the base portion 21D. The sealing member 6D is substantially in the shape of a disk, and includes only a metal layer. The sealing member 6D is arranged to have an outside diameter greater than a diameter of a lower end opening of the through hole 230D. The sealing member 6D is arranged to cover the lower end opening of the through hole 230D. The sealing member 6D is fixed to a lower surface of the base portion 21D through, for example, adhesion, welding, or the like. Note that a portion of the sealing member 6D may be arranged to close the lower end opening of the through hole 230D. An adhesive or the like may be arranged in a gap defined between a shaft 41D and the sealing member 6D.

Figure 13:
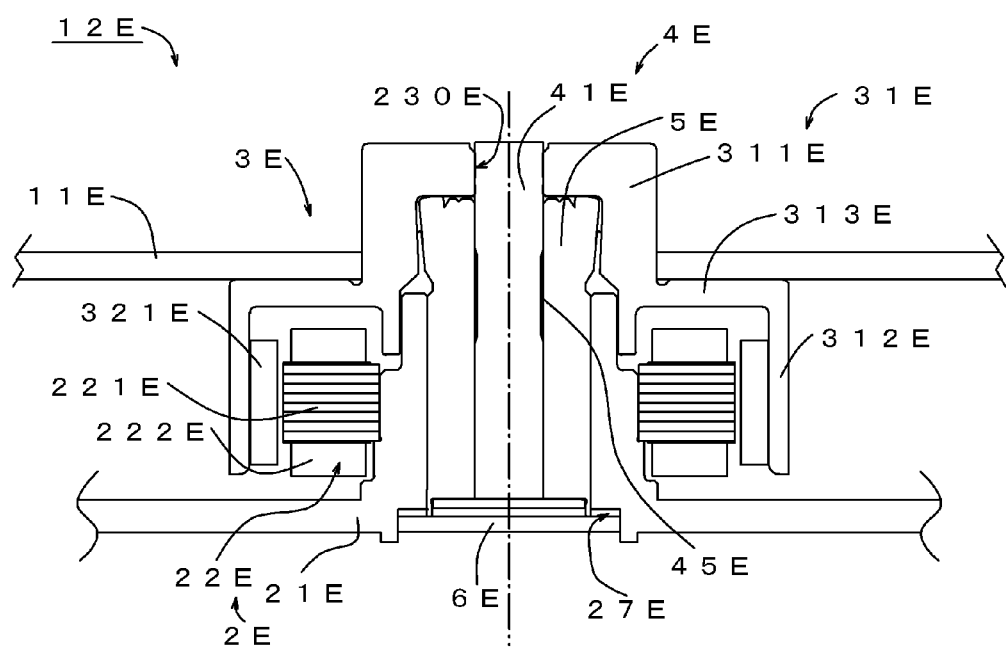
FIG. 13 is a vertical cross-sectional view of a spindle motor according to a preferred modification of the first preferred embodiment of the present invention.
Figure 14:
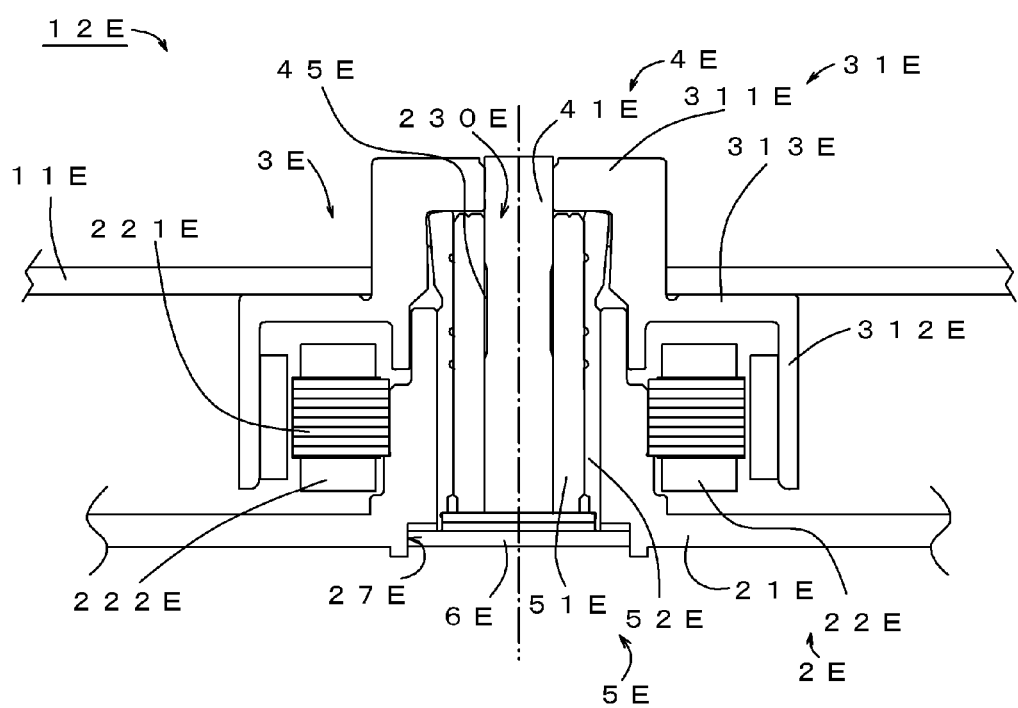
FIG. 14 is a vertical cross-sectional view of a spindle motor according to a preferred modification of the first preferred embodiment of the present invention.

Each of FIGS. 13 and 14 is a vertical cross-sectional view of a motor 12E according to another preferred modification of the first preferred embodiment. Referring to FIG. 13, the motor 12E is an outer-rotor motor, and is used in, for example, a disk drive apparatus. The motor 12E includes a bearing mechanism 4E, a stationary portion 2E, a rotating portion 3E, and a sealing member 6E. The stationary portion 2E includes a base portion 21E and a stator portion 22E. The base portion 21E is arranged to define a portion of a housing of the disk drive apparatus including the motor 12E. The base portion 21E includes a through hole 230E arranged to extend in the axial direction from an upper surface to a lower surface of the base portion 21E with a central axis J1 as a center. A lower end of the bearing mechanism 4E is covered with the sealing member 6E.

The stator portion 22E is an armature including a stator core 221E and a plurality of coils 222E. The stator core 221E is fixed to the base portion 21E, and includes a plurality of teeth (not shown) arranged to extend radially. Each coil 222E is wound around a separate one of the teeth.

The bearing mechanism 4E includes a shaft 41E, which is arranged to extend along the central axis J1 and includes an upper portion connected to the rotating portion, and a sleeve portion 5E. A dynamic pressure bearing portion 45E is defined between the shaft 41E and the sleeve portion 5E. The sleeve portion 5E is fixed in the through hole 230E. The shaft 41E is supported by the sleeve portion 5E to be rotatable about the central axis J1.

The rotating portion 3E is arranged to rotate about the central axis J1 with respect to the stationary portion 2E. The rotating portion 3E includes a rotor hub 31E and a rotor magnet 321E. A metal that is not a ferromagnetic material, such as, for example, an aluminum alloy, is used as a material of the rotor hub 31E. The rotor hub 31E includes a hub body 311E, a cylindrical portion 312E, and a disk mount portion 313E. The hub body 311E is substantially in the shape of a disk. The disk mount portion 313E is arranged to extend radially outward from a lower portion of the hub body 311E. The cylindrical portion 312E is arranged to project downward from an outer edge portion of the disk mount portion 313E. A lower surface of a disk 11E is arranged to be in contact with at least a portion of an upper surface of the disk mount portion 313E, which is annular. That is, the upper surface of the disk mount portion 313E defines a disk mount surface. The rotor magnet 321E is tubular, and is fixed to an inside of the cylindrical portion 312E. The rotor magnet 321E is arranged radially opposite to the stator portion 22E.

The base portion 21E includes a recessed portion 27E arranged to have a radial dimension greater than a diameter of the through hole 230E. A lower end opening of the recessed portion 27E is substantially annular, and is arranged to project axially downward below the lower surface of the base portion 21E. The sealing member 6E is substantially in the shape of a disk, and is made of only a metallic material. The sealing member 6E is fixed in the recessed portion 27E of the base portion 21E. A lower surface of the sealing member 6E is arranged at a level higher than that of the lower end opening of the recessed portion 27E. The sealing member 6E is arranged to close the through hole 230E. This contributes to preventing a gas arranged in an interior of a housing 14 from passing through the through hole 230E to leak out of the housing 14.

Note that the sleeve portion 5E may include a sleeve body 51E and a sleeve housing 52E as illustrated in FIG. 14, with the sleeve housing 52 fixed in the through hole 230E. Also note that the sealing member 6E may be fixed to a portion of the base portion 21E by crimping.

Preferred embodiments of the present invention are applicable to, for example, spindle motors and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus, the spindle motor comprising:
    a rotating portion including a rotor magnet, and arranged to rotate about a central axis extending in a vertical direction;
    a bearing mechanism arranged to support the rotating portion such that the rotating portion is rotatable about the central axis;
    a stator portion arranged opposite to the rotor magnet;
    a housing arranged to accommodate the rotating portion, the bearing mechanism, and the stator portion therein; and
    a sealing member; wherein
    the housing includes a base portion substantially in a shape of a plate and arranged to extend radially below the rotating portion;
    the base portion includes a first lower surface arranged to face downward, and a through hole arranged to pass through the base portion in the vertical direction and arranged to have a portion of the bearing mechanism arranged therein;
    the sealing member is arranged to cover a lower side of the through hole, and includes at least a metal layer;
    the base portion includes an inner circumferential portion arranged to define the through hole;
    a fixing region at which the bearing mechanism and the base portion are fixed to each other and at least one sealing region are defined between an outer circumferential portion of the bearing mechanism and the inner circumferential portion of the base portion;
    at the fixing region, the outer circumferential portion is fixed to the inner circumferential portion;
    at each of the at least one sealing region, a radially extending seal gap is defined between the bearing mechanism and an edge of the through hole; and
    the seal gap is arranged to have a sealant arranged therein.

2. The spindle motor according to claim 1, wherein the sealing member is made of only the metal layer, which is defined by a metallic material.

3. The spindle motor according to claim 1, wherein
    the sealing member includes the metal layer, a resin layer, and an adhesive layer; and
    the sealing member is fixed to the base portion through the adhesive layer.

4. The spindle motor according to claim 1, wherein
    the first lower surface is a lower surface of the base portion arranged to extend radially; and
    the sealing member includes an upper surface axially fixed to the first lower surface.

5. The spindle motor according to claim 4, wherein an adhesive layer is arranged between the upper surface of the sealing member and the first lower surface.

6. The spindle motor according to claim 1, wherein
    the first lower surface includes a recessed portion recessed axially upward and arranged to have a radial width greater than a diameter of the through hole; and
    a lower end opening of the through hole and the sealing member are arranged in the recessed portion.

7. The spindle motor according to claim 1, wherein
    the sealing member includes a tubular portion being tubular and arranged to extend axially upward from an upper surface of the sealing member;
    the first lower surface includes a recessed portion recessed axially upward and arranged to have a radial width greater than a diameter of the through hole;
    a lower end opening of the through hole and the sealing member are arranged in the recessed portion; and
    the recessed portion includes a groove portion arranged to have at least a portion of the tubular portion accommodated therein.

8. The spindle motor according to claim 6, wherein
    the recessed portion includes a second lower surface arranged to face downward and extend radially from a lower end opening of the through hole, and arranged at a level higher than that of the first lower surface; and
    the second lower surface is arranged to be substantially parallel to a lower surface of the base portion.

9. The spindle motor according to claim 8, wherein
    an upper surface of the sealing member is axially fixed to the second lower surface; and
    a lower surface of the sealing member is arranged at a level higher than that of the first lower surface.

10. The spindle motor according to claim 1, wherein the at least one sealing region is arranged above or below the fixing region or both above and below the fixing region.

11. The spindle motor according to claim 1, wherein one of the at least one sealing region is arranged below the fixing region and above the sealing member.

12. The spindle motor according to claim 10, wherein at the seal gap, one of an outer circumferential surface of the bearing mechanism and a wall surface of the through hole includes a tapered surface angled with respect to the central axis.

13. The spindle motor according to claim 1, wherein
    the bearing mechanism includes:
        a shaft arranged to extend along the central axis; and a sleeve portion defining a portion of the rotating portion, and arranged opposite to the shaft with a dynamic pressure bearing portion defined therebetween; and a lower end of the shaft is fixed in the through hole.

14. The spindle motor according to claim 1, wherein the bearing mechanism includes:
   a shaft arranged to extend along the central axis;
   a bottom portion arranged to extend radially outward from a lower portion of the shaft;
   a wall portion arranged to extend axially upward from an outer edge of the bottom portion; and
   a sleeve portion defining a portion of the rotating portion, and arranged opposite to the shaft with a dynamic pressure bearing portion defined therebetween; and the wall portion is fixed in the through hole.

15. The spindle motor according to claim 1, wherein the bearing mechanism includes:
   a shaft arranged to extend along the central axis, and including an upper portion connected to the rotating portion; and
   a sleeve portion arranged opposite to the shaft with a dynamic pressure bearing portion defined therebetween; and the sleeve portion is fixed in the through hole.

16. The spindle motor according to claim 15, wherein the sleeve portion includes a sleeve body and a sleeve housing; and the sleeve housing is fixed in the through hole.

17. A disk drive apparatus comprising:
   the spindle motor of claim 1;
   an access portion arranged to perform at least one of reading and writing of information from or to a disk supported by the spindle motor; and
   a housing arranged to accommodate at least a portion of the spindle motor and the access portion.

* * * * *